United States Patent
Gupta

(10) Patent No.: US 10,447,554 B2
(45) Date of Patent: Oct. 15, 2019

(54) USER PRESENCE BASED CONTROL OF REMOTE COMMUNICATION WITH INTERNET OF THINGS (IOT) DEVICES

(71) Applicant: QUALCOMM Incorporated, San Diego, CA (US)

(72) Inventor: Binita Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 14/314,498

(22) Filed: Jun. 25, 2014

(65) Prior Publication Data

US 2015/0006695 A1 Jan. 1, 2015

Related U.S. Application Data

(60) Provisional application No. 61/839,815, filed on Jun. 26, 2013.

(51) Int. Cl.
*H04L 12/24* (2006.01)
*H04L 29/08* (2006.01)
(Continued)

(52) U.S. Cl.
CPC ............ *H04L 41/32* (2013.01); *H04L 63/107* (2013.01); *H04L 67/125* (2013.01); *H04L 67/18* (2013.01);
(Continued)

(58) Field of Classification Search
CPC ..... H04L 41/32; H04L 63/107; H04L 67/125; H04L 67/18; H04M 1/72533;
(Continued)

(56) References Cited

U.S. PATENT DOCUMENTS 8,539,567 B1  9/2013 Logue et al.
8,561,147 B2 * 10/2013 Lee ................. H04L 12/2818
                                                    713/153
(Continued)

FOREIGN PATENT DOCUMENTS

CN      101411121 A    4/2009
EP       1507396 A1    2/2005
(Continued)

OTHER PUBLICATIONS

International Search Report and Written Opinion—PCT/US2014/044371—ISA/EPO—dated Sep. 29, 2014.
(Continued)

*Primary Examiner* — Uzma Alam
(74) *Attorney, Agent, or Firm* — Muncy, Geissler, Olds & Lowe, P.C.

(57) ABSTRACT

Disclosed systems and methods include an Internet of Things (IoT) SuperAgent/Gateway for controlling remote communication with an IoT proximal network comprising one or more IoT devices. The presence of an IoT user device in the IoT proximal network is detected. The remote communication is disabled if the IoT user device is present in the IoT proximal network and if the remote communication criteria for disabling the remote communication are met. The remote communication is enabled if the IoT user device is not present in the IoT proximal network and if the remote communication criteria for enabling the remote communication are met. The remote communication includes remote access of the one or more of the IoT devices by the IoT user device, as well as, remoting notifications from the one or more the IoT devices to the IoT user device.

30 Claims, 4 Drawing Sheets

(51) Int. Cl.

| | |
|---|---|
| *H04M 1/725* | (2006.01) |
| *H04W 4/02* | (2018.01) |
| *H04W 84/12* | (2009.01) |
| *H04L 29/06* | (2006.01) |
| *H04W 4/021* | (2018.01) |
| *H04W 12/08* | (2009.01) |
| *H04W 48/04* | (2009.01) |
| *H04W 4/70* | (2018.01) |
| *H04W 12/00* | (2009.01) |
| *H04W 84/18* | (2009.01) |

(52) U.S. Cl.
CPC ... *H04M 1/72533* (2013.01); *H04M 1/72577* (2013.01); *H04W 4/021* (2013.01); *H04W 4/70* (2018.02); *H04W 12/08* (2013.01); *H04W 48/04* (2013.01); *H04W 4/023* (2013.01); *H04W 12/00503* (2019.01); *H04W 84/12* (2013.01); *H04W 84/18* (2013.01)

(58) Field of Classification Search
CPC . H04M 1/72577; H04W 12/08; H04W 48/04; H04W 4/005; H04W 4/021; H04W 4/023; H04W 84/12; H04W 84/18
See application file for complete search history.

(56) References Cited

U.S. PATENT DOCUMENTS

| | | | |
|---|---|---|---|
| 8,630,741 B1 | 1/2014 | Matsuoka et al. | |
| 9,008,055 B2* | 4/2015 | Anderson | H04L 63/08 370/255 |
| 9,042,360 B2* | 5/2015 | Stirbu | H04W 8/18 370/338 |
| 9,363,099 B2* | 6/2016 | Forsman | H04L 12/2834 |
| 9,398,503 B2* | 7/2016 | Sirotkin | H04W 4/70 |
| 10,033,807 B2* | 7/2018 | Yang | H04W 8/22 |
| 2003/0056114 A1* | 3/2003 | Goland | H04L 63/04 726/5 |
| 2005/0160477 A1* | 7/2005 | Saito | H04L 12/2805 726/12 |
| 2006/0013197 A1* | 1/2006 | Anderson | H04L 63/08 370/352 |
| 2006/0062391 A1* | 3/2006 | Lee | H04L 63/061 380/270 |
| 2006/0069911 A1* | 3/2006 | Takabayashi | H04L 63/0428 713/150 |
| 2007/0169203 A1* | 7/2007 | Kim | H04L 63/0492 726/26 |
| 2007/0202838 A1* | 8/2007 | Zancola | G01S 5/0263 455/344 |
| 2007/0253021 A1* | 11/2007 | Mehta | A61B 5/0002 358/1.15 |
| 2007/0255116 A1* | 11/2007 | Mehta | A61B 5/0002 600/300 |
| 2008/0160938 A1* | 7/2008 | Hwang | H04L 12/282 455/132 |
| 2008/0287064 A1* | 11/2008 | Weiss | H04W 8/005 455/41.2 |
| 2009/0080453 A1* | 3/2009 | Stirbu | H04L 12/2834 370/433 |
| 2009/0086688 A1* | 4/2009 | Kvache | H04L 12/2809 370/338 |
| 2009/0157198 A1* | 6/2009 | Morikawa | H04L 12/2814 700/12 |
| 2009/0239502 A1* | 9/2009 | Dempo | H04L 12/4011 455/411 |
| 2009/0254980 A1* | 10/2009 | Kanaparti | H04L 12/2818 726/4 |
| 2010/0071053 A1* | 3/2010 | Ansari | G06Q 30/04 726/12 |
| 2010/0153538 A1* | 6/2010 | Hyziak | H04W 76/12 709/224 |
| 2010/0162328 A1* | 6/2010 | Karaoguz | H04N 7/106 725/80 |
| 2010/0164720 A1* | 7/2010 | Kore | H04L 63/107 340/541 |
| 2011/0039579 A1* | 2/2011 | Karjalainen | H04W 4/021 455/456.1 |
| 2012/0044861 A1* | 2/2012 | Lu | H04W 72/0406 370/328 |
| 2012/0146761 A1* | 6/2012 | de Clerq | G05B 15/02 340/4.3 |
| 2012/0149312 A1* | 6/2012 | Velusamy | H04M 1/72569 455/68 |
| 2012/0151058 A1* | 6/2012 | Lee | H04L 12/2834 709/225 |
| 2012/0166668 A1* | 6/2012 | Mathews | H04L 12/2812 709/231 |
| 2013/0210426 A1* | 8/2013 | Forssell | H04W 8/20 455/433 |
| 2013/0244635 A1* | 9/2013 | Weiss | H04W 8/005 455/418 |
| 2014/0053246 A1* | 2/2014 | Huang | H04L 63/062 726/4 |
| 2014/0058568 A1 | 2/2014 | Imes et al. | |
| 2014/0067094 A1 | 3/2014 | Park et al. | |
| 2014/0075488 A1* | 3/2014 | Christudass | H04L 41/5058 725/114 |

FOREIGN PATENT DOCUMENTS

| | | |
|---|---|---|
| JP | 2001251312 A | 9/2001 |
| JP | 2006128824 A | 5/2006 |
| JP | 2008067199 A | 3/2008 |
| JP | 2013192016 A | 9/2013 |
| WO | 03098909 A1 | 11/2003 |
| WO | 2012112091 A1 | 8/2012 |
| WO | 2014122943 A1 | 8/2014 |

OTHER PUBLICATIONS

Zeng D., et al., "IF-THEN in the Internet of Things," 2011 3rd International Conference on Awareness Science and Technology (iCAST), 2011, pp. 503-507.

* cited by examiner

USER PRESENCE BASED CONTROL OF REMOTE COMMUNICATION WITH INTERNET OF THINGS (IOT) DEVICES

CLAIM OF PRIORITY UNDER 35 U.S.C. § 119

The present Application for Patent claims the benefit of Provisional Patent Application No. 61/839,815 entitled "USER PRESENCE BASED CONTROL OF REMOTE ACCESS TO INTERNET OF THINGS (IoT) DEVICES" filed Jun. 26, 2013, and assigned to the assignee hereof and hereby expressly incorporated herein by reference in its entirety.

FIELD OF DISCLOSURE

Embodiments of this disclosure relate to remote access to IoT devices and/or receiving remote notifications from the IoT devices. More particularly, exemplary embodiments are directed to systems and methods for disabling or enabling remote communication including remote access to/remoting notifications from IoT devices, based on remote communication criteria, which include presence or absence thereof, of one or more users within a designated proximal network of the IoT devices among other remote communication criteria.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

Market trends, related to home improvement, for example, are driving development for new "smart" services, including consolidation by service providers marketing 'N' play (e.g., data, voice, video, security, energy management, etc.) and expanding home networks. Some applications for IoT include smart homes and buildings capable of having centralized control over virtually any device or appliance in the home or office.

As such, in the near future, increasing development in IoT technologies will lead to numerous IoT devices surrounding a user at home, in vehicles, at work, and many other locations. In a home setting there, for example, there may be numerous IoT devices within a designated vicinity that are connected to the home WiFi network. Such a network may also be referred to as a "proximal network," in contrast to a remote network over which a user may remotely access IoT devices on the proximal network. More specifically, hundreds of IoT devices, such as, appliances, TVs, light fixtures, air conditioners, music systems, garage door, home security system, fans, sprinkler system, microwave oven, oven, dishwasher, clothes washer and dryer, etc., may be connected to a proximal home IoT network. A user may wish to access and control one or more of these devices remotely from outside the home IoT network, for example, from the user's office. Thus it is desirable to provide remote access capability to the home IoT network.

However allowing such remote access gives rise to security concerns. For example, enabling remote access/control to a user's home IoT network causes vulnerability to network security threats and leaves the home IoT network open to attacks from unauthorized users or malicious agents. The IoT devices may also be configured to provide status updates and important event notifications to the user. However, if these notifications are provided to the user, when the user is in a remote location, over a network through which remote communication is possible, unauthorized users may gain access to these remote notifications, which could also lead to security and privacy threats to the authorized user.

Accordingly, there is a need to reduce the risk of attacks which can arise from allowing remote communication with IoT devices.

SUMMARY

Exemplary embodiments include systems and methods related to an Internet of Things (IoT) SuperAgent/Gateway for controlling remote communication with a Internet of Things (IoT) proximal network comprising one or more IoT devices. The presence of an IoT user device in the IoT proximal network is detected. The remote communication is disabled if the IoT user device is present in the IoT proximal network and if the remote communication criteria for disabling the remote communication are met. The remote communication is enabled if the IoT user device is not present in the IoT proximal network and if the remote communication criteria for enabling the remote communication are met. The remote communication includes remote access of the one or more of the IoT devices by the IoT user device, as well as, remoting notifications of messages or events from the one or more the IoT devices to the IoT user device.

For example, an exemplary embodiment pertains to a method of controlling remote communication with a Internet of Things (IoT) proximal network comprising one or more IoT devices, the method comprising: detecting presence of an IoT user device in the IoT proximal network and determining if one or more remote communication criteria for disabling remote communication with the one or more IoT devices in the IoT proximal network are met. The remote communication is disabled if the IoT user device is present in the IoT proximal network and if the remote communication criteria for disabling the remote communication are met.

Another exemplary embodiment is directed to a method of controlling remote communication with a Internet of Things (IoT) proximal network comprising one or more IoT devices, the method comprising: detecting absence of an IoT user device in the IoT proximal network and determining if one or more remote communication criteria for enabling remote communication with the one or more IoT devices in the IoT proximal network are met. The remote communication is enabled if the IoT user device is absent from the IoT proximal network and if the remote communication criteria for enabling the remote communication are met.

Yet another exemplary embodiment is directed to an apparatus comprising: an Internet of Things (IoT) SuperAgent/Gateway configured to control remote communication with a IoT proximal network comprising one or more IoT devices, a presence detection block configured to detect whether an IoT user device is present in the IoT proximal network, and a remote access/remoting control rules block configured to determine if one or more remote communication criteria for enabling or disabling remote communication with the one or more IoT devices in the IoT proximal network are met. The apparatus further comprises a remote access/remoting enable/disable block configured to disable the remote communication if the IoT user device is present in the IoT proximal network and if the remote communication criteria for disabling the remote communication are met.

Yet another exemplary embodiment is directed to a communication system comprising: means for controlling remote communication with a Internet of Things (IoT) proximal network comprising one or more IoT devices, means for detecting whether an IoT user device is present in the IoT proximal network, means for determining if one or more remote communication criteria for enabling or disabling remote communication with the one or more IoT devices in the IoT proximal network are met, and means for disabling the remote communication if the IoT user device is present in the IoT proximal network and if the remote communication criteria for disabling the remote communication are met.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
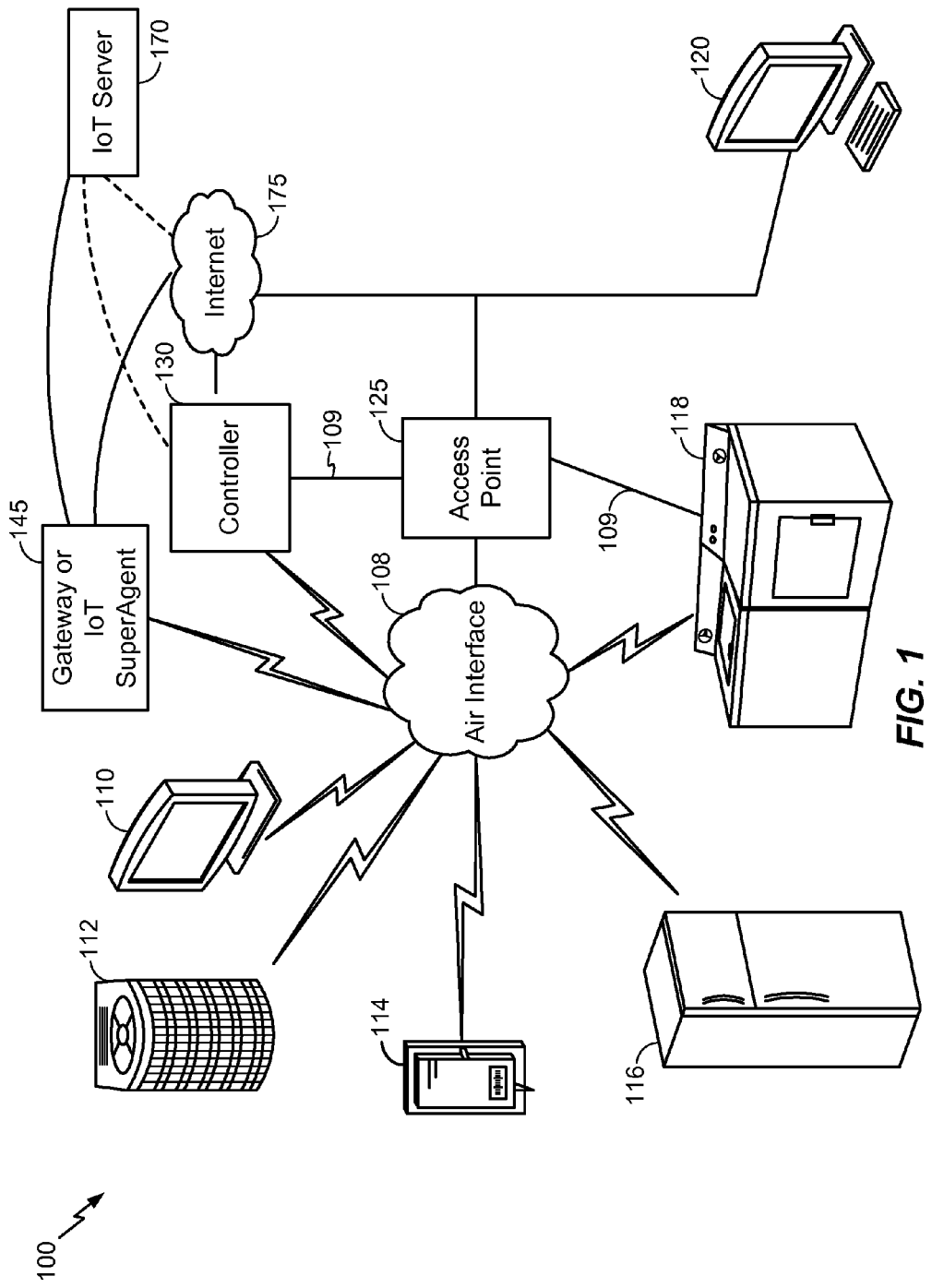
FIG. 1 illustrates a high-level system architecture of a wireless communications system in accordance with an aspect of the disclosure.

Various aspects are disclosed in the following description and related drawings to show specific examples relating to exemplary embodiments of proximity detection between Internet of Things (IoT) devices. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet.

Exemplary embodiments may pertain to IoT devices which may be accessed remotely. Remote access may be available for IoT devices which are located within a user's home, or more generally, within any "proximal network," which can refer to devices within a predefined geographical boundary or directly connected to a home network. For example, a user may be able to monitor a security camera, operate heating, cooling, air-conditioning (AC) systems, operate home entry doors, open garage doors, etc., from a remote location or when the user is away from a proximal home network. Further, the IoT devices may also be capable of sending notifications of messages or events (e.g., that a backyard door has been unlocked) to the user. Such notifications may also be provided when the user is in a remote location or away from home or a predefined proximal location. Sending such notifications to a user in a remote location by an IoT device is referred to herein as "remoting" the notifications or as the notifications being "remoted," where the notifications include notifications of messages or events. More generally, "remote communication," as discussed herein, includes remote access of one or more of the IoT devices in the IoT proximal network through a remote network or communication medium, as well as, remoting of notifications by one or more IoT devices in the IoT proximal network transmitted or broadcast through a remote network or communication medium. Such remote communication may be vulnerable or exposed to security threats over the remote network or communication medium which enables the remote communication.

As such, exemplary aspects are directed to improving safety of remote access and/or remoting functionalities for a designated proximal network of IoT devices and reducing the exposure of the IoT devices to security threats. In some aspects, the exposure is reduced by reducing the duration and/or controlling the situations when remote communications to/from IoT devices in the proximal network are permitted. For example, remote access and remoting may be permitted only when a user is away from the home or proximal network. When the user is within the proximal network, there may be no need for the user to access the IoT devices through a remote connection, as the user may be able to access the IoT devices through a local or home network. Thus, exposure to outside threats through remote connections can be minimized when the user is at home by completely shutting off remote access when remote access is not required. Similarly, remoting may also be turned off when the user is within the home network. For example, a notification from an IoT device that a backyard door in the user's home is unlocked or that a user's home window is broken, may be prevented from being sent out on a remote network, or remoted, when the user is at home.

Thus, embodiments are configured to detect or recognize presence or absence of one or more users within a proximal network and base the disabling or enabling of remote access and remoting based on this detection or recognition. In this manner, IoT devices within a home network or any other designated proximal network can be made safe from outside attacks at least during the times when the remote access and/or remoting are disabled. Accordingly, in some cases, the presence of one or more primary users in the vicinity or proximity of a proximal network can be used to enable or disable remote access and/or remoting. Several other additional or alternative criteria and/or events will be provided in this disclosure as exemplary factors that may be used to impose restrictions on remote access and/or remoting. Exemplary systems and methods according to the embodiments will now be described with reference to the figures.

With reference to FIG. 1, a high-level view of the system architecture of wireless communications system 100, in accordance with an aspect of this disclosure, is illustrated. Wireless communications system 100 comprises a plurality of IoT devices, which, as illustrated, include television 110, air conditioning (AC) unit 112, thermostat 114, refrigerator 116, and washer and dryer 118. IoT devices 110-118 are configured to communicate with an access network (e.g., an access point 125) over air interface 108 and/or direct wired connection 109. Air interface 108 can comply with a wireless Internet protocol (IP), such as IEEE 802.11. Internet 175 includes a number of routing agents and processing agents (not shown in FIG. 1 for the sake of convenience) and is a global system of interconnected computers and computer networks that uses a standard Internet protocol suite (e.g., the Transmission Control Protocol (TCP) and IP) to communicate among disparate devices/networks. In exemplary embodiments, remote access and/or remoting may be possible through Internet 175, for example, as will be discussed further below.

Computer 120, such as a desktop or personal computer (PC), is shown as connecting to Internet 175 directly (e.g., over an Ethernet connection or Wi-Fi or 802.11-based network). Computer 120 may alternatively, or additionally, have a wired connection to Internet 175 or computer 120 may be connected directly to access point 125. Although illustrated as a desktop computer, computer 120 may be a laptop computer, a tablet computer, a PDA, a smart phone, or the like. Computer 120 may be an IoT device and/or contain functionality to manage an IoT network/group, such as the network/group of IoT devices 110-118.

IoT server 170 can be optional, and can be implemented as a plurality of structurally separate servers, or alternately may correspond to a single server. The group of IoT devices 110-120 may be a peer-to-peer (P2P) network, and can communicate with each other directly over air interface 108 and/or wired connection 109. Alternatively, or additionally, some or all of IoT devices 110-120 may be configured with a communication interface independent of air interface 108 and wired connection 109. For example, if air interface 108 corresponds to a Wi-Fi interface, certain of IoT devices 110-120 may have Bluetooth or NFC interfaces for communicating directly with each other or other Bluetooth or NFC-enabled devices.

Moreover, wireless communications system 100 may include controller device 130, which may alternatively be referred to as an IoT supervisor or manager. While controller device 130 has been illustrated as a standalone device or unit, in some implementations, controller device 130 may be integrated in one of IoT devices 110-120, such as computer 120. For example, controller device 130 may be integrated in computer 120 implemented as a smart phone. In some aspects, controller device 130 may be a physical device or a software application running on a physical device. In one embodiment, the controller device 130 may generally observe, monitor, control, or otherwise manage the various other components in wireless communications system 100. For example, controller device 130 can communicate with an access network (e.g., access point 125) over air interface 108 and/or direct wired connection 109 to interact with IoT devices, wherein such interaction can include monitoring or managing attributes, activities, or other states associated with the various IoT devices 110-120 in wireless communications system 100. The interaction can also include receiving notifications of events or status updates from the various IoT devices 110-120, which may be remoted in some instances. In exemplary embodiments, the access network including air interface 108 and/or direct wired connection 109 can be part of a proximal network comprising IoT devices 110-120. Controller device 130, as previously mentioned, may be, or reside on, a smart phone or portable device through which a user can interact with IoT devices 110-120 over the proximal network. Aspects of controller device 130 may also be implemented using a software application, such as, a smart phone "App," which can include a user interface.

Controller device 130 may also have a wired or wireless connection to Internet 175 and optionally to IoT server 170 (shown as a dotted line). Controller device 130 may obtain information from Internet 175 and/or IoT server 170 that can be used to further monitor or manage attributes, activities, or other states associated with the various IoT devices 110-120. In exemplary embodiments, controller device 130 may connect to Internet 175 from a remote location that is spatially removed from the proximal network, for example, in order to interact with IoT devices 110-120. This can comprise remote access of IoT devices 110-120, as well as, remoting from IoT devices 110-120. which will be further described with reference to FIG. 2.

Wireless communications system 100 may also include a Gateway or IoT SuperAgent/Gateway 145, which will be discussed in further detail in the following sections. Briefly, IoT SuperAgent/Gateway 145 can communicate with IoT devices 110-120 in the proximal network to monitor and control them, as well as, receive notifications from IoT devices 110-120, where such notifications may be initiated by the devices themselves based on an event detection or status change, and as such, the notifications from IoT device 110-120 need not be based only on inquiries from Super-Agent 145, for example. The Gateway or IoT SuperAgent/Gateway 145 may provide interfaces for a user to remotely access IoT devices 110-120 and/or for remoting notifications by the IoT devices 110-120 to a user.

Figure 2:
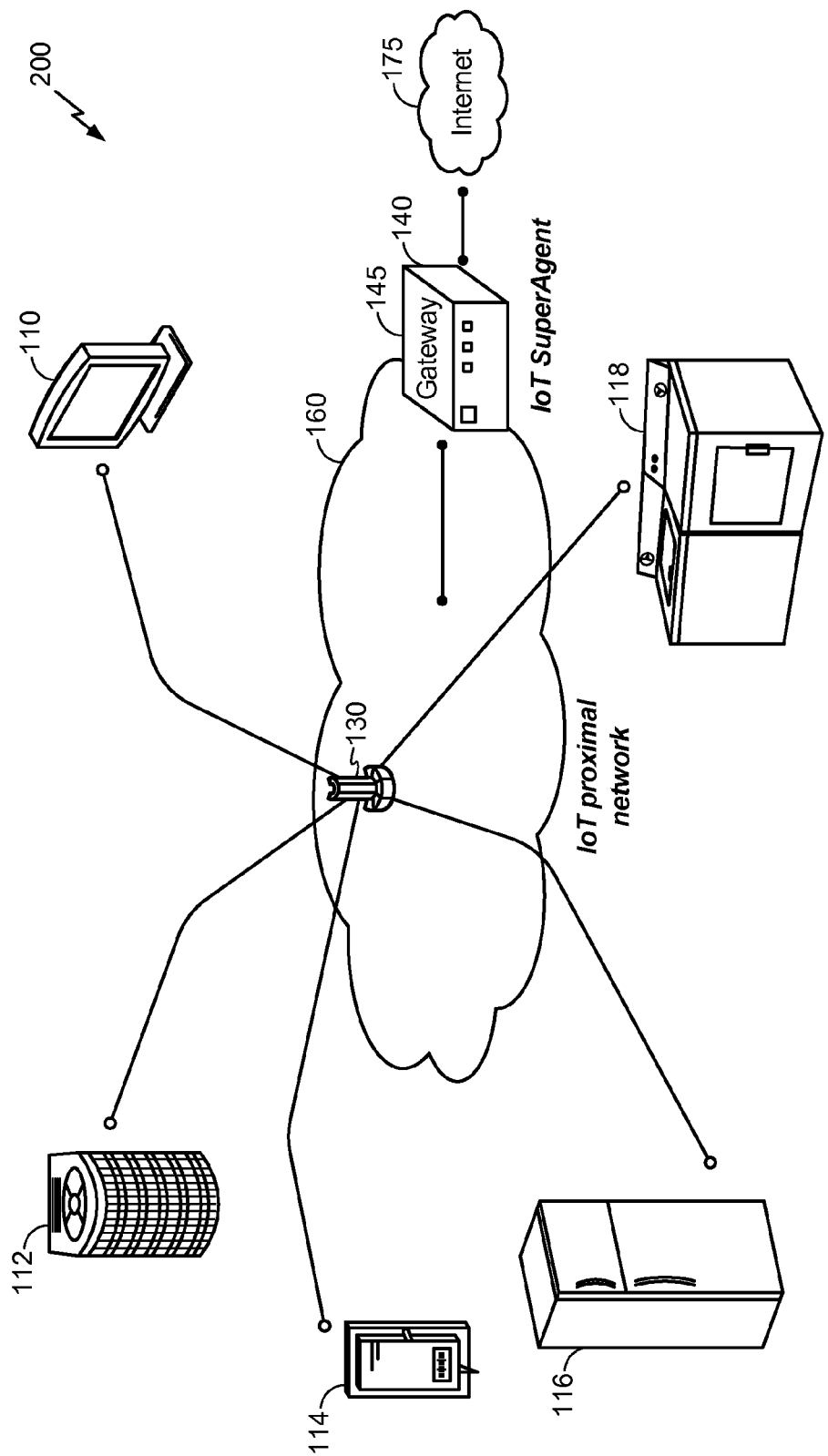
FIG. 2 illustrates an exemplary wireless communication system comprising an IoT proximal network capable of remote communication with IoT devices in the proximal network, according to aspects of this disclosure.

With reference to FIG. 2, an exemplary embodiment comprising wireless communication system 200 is illustrated. In general, wireless communications system 200 may include various components that are the same and/or substantially similar to wireless communications system 100 of FIG. 1, and for brevity and ease of description, various details relating to certain components in wireless communications system 200 may be omitted herein to the extent that the same or similar details have already been provided above in relation to the wireless communications system 100. Wireless communications system 200 illustrates IoT proximal network 160 which includes a group of locally connected IoT devices 110-118. While schematic communication links (which may be wired or wireless) are shown between controller device 130 and IoT device 110-118, various other peer-to-peer communications between the IoT devices 110-118, as well as, controller device 130 are possible, as are known in the art, but omitted from illustration herein, for the sake of conciseness.

Proximal network 160 can be a user's home network in some examples. IoT devices 110-118 can be connected to and/or communicate with each other via an IoT SuperAgent/Gateway 145 connected to the Internet 175. IoT SuperAgent/Gateway 145 may provide functionality to manage and control IoT devices 110-118 in proximal network 160. IoT SuperAgent/Gateway 145 may provide functionality for receiving notifications from IoT devices 110-118 in proximal network 160, where in some cases IoT SuperAgent/Gateway 145 may be capable of remoting these notifications to a user over Internet 175. In some aspects, controller device 130 can be located outside proximal network 160 (not illustrated in FIG. 2, but illustrated in FIG. 3), and IoT SuperAgent/Gateway 145 may also provide interfaces for remotely accessing and controlling IoT devices 110-118, as well as for remoting notifications from IoT devices 110-118, for example, through controller device 130. In aspects not discussed in detail here, IoT SuperAgent/Gateway 145 may also be capable of communicating with and managing one or more IoT devices (or in some cases, one or more groups of IoT devices) outside the proximal network. At a high level, controller device 130 can communicate from outside proximal network 160 with IoT device 110-118 through IoT SuperAgent/Gateway 145. IoT SuperAgent/Gateway 145 may correspond to or include the functionality of access point 125. Alternatively, IoT SuperAgent/Gateway 145 may correspond to or include the functionality of an IoT server, such as IoT server 170. In general, IoT SuperAgent/Gateway 145 may encapsulate gateway functionality 145, which will be discussed in further detail with regard to the embodiments.

Figure 3:
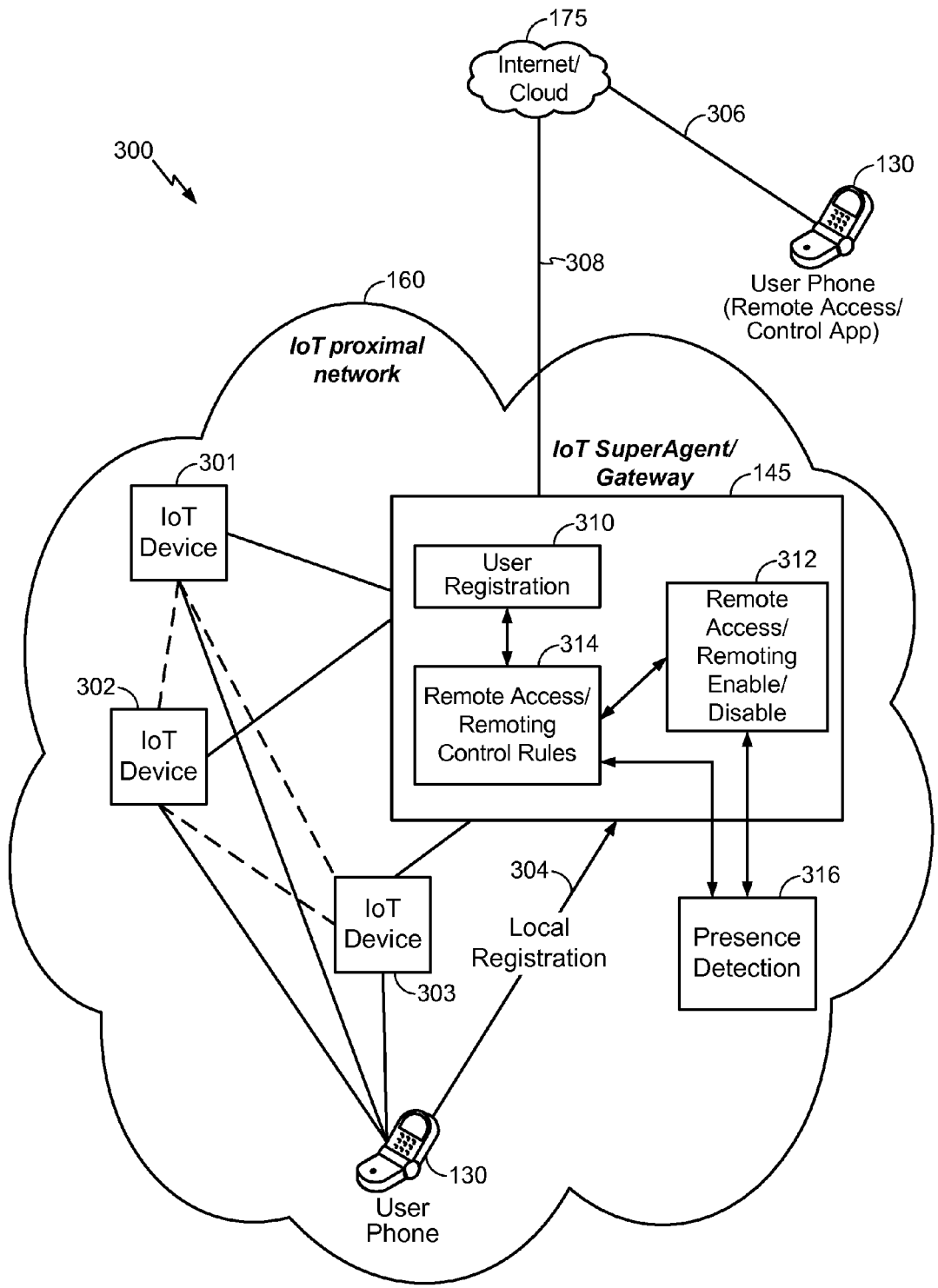
FIG. 3 illustrates aspects of this disclosure pertaining to controlling remote communication with IoT devices in an IoT proximal network based on exemplary remote communication criteria.

With reference to FIG. 3, a simplified schematic view of wireless communication system 300 is illustrated, to highlight certain key aspects of this disclosure. In many aspects, wireless communication system 300 is similar to wireless communication systems 100 and 200 of FIGS. 1 and 2, and accordingly, a detailed description of the common features will be omitted herein, for the sake of brevity. In FIG. 3, controller device 130 is illustrated as a user phone, depicted in two separate locations—once within the vicinity of IoT proximal network 160, and once in a remote location. IoT device 301-303 are generic depictions of exemplary IoT devices, such as IoT device 110-118 in FIGS. 1-2. IoT devices 301-303 are located within IoT proximal network 160. IoT devices 301-303 are capable of communicating with each other (shown in dashed lines), and can also communicate directly with IoT SuperAgent/Gateway 145, as well as, with controller device/user phone 130 while user phone 130 is within IoT proximal network 160. In certain aspects, objects such as IoT devices 301-303 can be defined as belonging to IoT proximal network 160 if they are physically located within a predefined geographical boundary or similar physical confines. In some aspects, devices within IoT proximal network 160 may need to be accessible and/or controllable from devices/objects outside IoT proximal network 160. For example, the user may want to control and/or receive notifications from IoT devices 110-118 in proximal network 160, when the user is in a remote location, such as, the user's office. In some aspects, the remote access may also be initiated by the cloud service (shown as part of Internet 175), rather than being initiated by the user or the user's phone 130. To support such accesses by the user or the cloud service, IoT SuperAgent/Gateway 145 may act as a gateway to IoT proximal network 160 and provide interfaces for remotely accessing IoT devices 110-118 and/or for remoting notifications from IoT device 110-118. However, to protect IoT proximal network 160 from attacks, such as, internet based attacks over Internet 175, IoT SuperAgent/Gateway 145 can implement a set of rules or impose certain criteria to be met, based on which remote access and/or remoting may be enabled or disabled.

In one aspect, the criteria may relate to presence or absence of user phone 130 within IoT proximal network 160. Various other remote access and remoting rules or criteria, which may be based, for example, on events or times, are also possible. As discussed herein, remote "access" of a IoT device within a proximal network by a user may substantially refer to a first direction of communication initiated by the user (even though this communication may involve some back and forth interactions between the IoT device and the user). Further, it will be noted that the first direction also includes communication that may be initiated by the cloud service. However, for the sake of ease of description, this disclosure will focus on the communication initiated by the user, while it will be understood that such communication can also be initiated by the cloud service. On the other hand, "remoting" from an IoT device within a proximal network to a user may refer to an opposite, second direction of communication initiated by the IoT device. Collectively, these two directions of communications may be referred to as "remote communication," which can include remote access as well as remoting, as the case may be. Correspondingly, the criteria used for enabling or disabling remote communication (remote access and/or remoting) may be referred to as remote communication criteria. Various remote communication criteria in the context of communication between a remote user and IoT devices in a proximal network will be described herein with reference to specific examples and scenarios. However, it will be understood that these examples and scenarios are merely provided for the sake of explanation, and are not to be construed as a limitation. As such, these remote communication criteria may encompass any other rule or criterion which may be used to enable or disable remote communication between one or more users and IoT devices of a proximal network, based on presence or absence of the users within the proximal network.

Accordingly, in aspects where remote access rules may be based on user presence, the remote access rules may be implemented such that when user phone 130 is in a remote location, user phone 130 may be able to communicate or interact with IoT device 301-303 over Internet 175 (over paths 306, 308), through IoT SuperAgent/Gateway 145. As previously noted, Internet 175 may also include cloud services, which may be able to initiate remote communication according to disclosed aspects. User phone 130 may include mobile applications such as a control application which may be utilized for controlling IoT devices 301-303 remotely, as well as, receiving remote notifications from IoT device 301-303. As previously discussed, allowing such remote access and/or remoting may expose IoT proximal network 160 to security threats from malicious agents or unauthorized users outside IoT proximal network 160. It is possible that these attacks may be carried out by accessing IoT proximal network 160 over Internet 175 (e.g. via path 308) and/or by attacking user privacy/security with unauthorized access of notifications from IoT devices 301-303 that are remoted over Internet 175. Accordingly, IoT SuperAgent/Gateway 145 may be configured to deny remote communication, e.g., remote access and/or remoting, over such susceptible paths when the user may not require remote access, for example, when the user is present within IoT proximal network 160 and therefore may be able to access IoT device 301-303 without relying on Internet 175 for such access. For the sake of completeness, it will also be noted that denying remote communication in this case would mean that the cloud service, if any, will also be denied remote communication.

In related aspects, IoT SuperAgent/Gateway 145 may first register user phone 130, as an authorized or registered user in user registration block 310. In some cases, this can be performed by a local registration (e.g. using the phone number or other identity of user phone 130) when user phone 130 is present within IoT proximal network 160. The aforementioned control application may also be used instead of or in combination with the user's identity for performing the registration. The registration may involve additional authentication processes that will be recognized by skilled persons (e.g. requiring the user to be connected to a home Wi-Fi network and/or clearing password authentications, etc.). Once registered, user phone 130 will be stored as a recognized authorized user on IoT SuperAgent/Gateway 145, for example, as a primary user. In this case, it is assumed that user phone 130 is the primary user.

Although not particularly illustrated for multiple users, it will be appreciated that one or more user devices can be registered under similar fields. For example, mobile phones of the residents or a subset of residents in a home can be registered as authorized users. In some cases the users may be tiered, with different rules applicable to different users based on their tier—for example, in a conventional household, mobile phones of one or more parents or adults may be registered as primary users, while mobile phones of children or minors may be registered as secondary users of lower tier, such that enabling/disabling remote communications can be based on predefined rules associated with a user's designation. In other words, based on the registration of the IoT user device in IoT proximal network, one or more remote communication criteria for enabling or disabling remote communication to IoT proximal network 160 can include designations or priority levels of each IoT user device among a set of one or more IoT devices that are capable of communicating with the IoT devices in IoT proximal network 160. The set of IoT user devices may be tiered based on their registrations. Remote communication criteria can be defined such that remote access/remoting for a first set of one or more IoT devices (e.g., water heater, main door entry, oven, etc., not explicitly illustrated) is disabled when the presence of one or more primary users or high priority IoT user devices are detected in IoT proximal network 160. However the remote communication including remote access/remoting can remain enabled for a second set of IoT devices (e.g. bedroom lighting, not explicitly illustrated), for other tier users such as secondary users.

Further, in some cases, disabling the remote communication may relate to selectively disabling remote communication capability with respect to selected functionalities of the one or more IoT user devices. For example, with regard to the IoT device comprising an oven, it may be possible to disable on/off functionality for oven when the one or more primary users are detected to be present in IoT proximal network 160. However, while the on/off functionality can be disabled for secondary users when one or more primary users are present, a subset of functionalities of the oven may nevertheless be available. This subset or selected functionalities may be made available to the secondary users, for example. Thus, the secondary users may be able to monitor whether the oven is on and what is cooking inside the oven, even when the one or more primary users are present within IoT proximal network 160.

Remote access control rules as well as rules pertaining to when remoting may be allowed, may be customizable, defined ahead of time, and stored in the block depicted as remote access/remoting control rules 314 in IoT SuperAgent/Gateway 145. Also shown in the illustration of IoT SuperAgent/Gateway 145 is the block, remote access/remoting enable/disable 312, which can be configured to enable or disable remote access or remoting according to the remote access/remoting control rules determined in block 314.

Presence detection block 316 is depicted outside IoT SuperAgent/Gateway 145, and in communication with at least remote access/remoting enable/disable block 312. It will be understood that there is no requirement for presence detection block 316 to be physically located outside IoT SuperAgent/Gateway 145, but in some aspects, the functionality of presence detection block 316 can be implemented within IoT SuperAgent/Gateway 145, and even more specifically merged with any one or more of blocks 310-314. Essentially, presence detection block 316 can be configured to detect presence or absence of the registered user(s) or user phone 130 within IoT proximal network 160. Presence detection block 316 may detect presence/absence of user phone 130 using any known discovery mechanisms, including but not limited to detecting connection of user phone 130 to a local network only available within IoT proximal network 160, based on a geographical location of user phone 130 (e.g., based on global positioning systems (GPS)), and/or by means of discovering the control application on user phone 130. In some cases, presence detection block 316 may detect presence/absence based on the registration of user phone 130, for example, by periodically checking whether the registration of user phone 130 is current. User phone 130 may generate periodic registration with user registration block 310, which can be used to update presence detection block 316 of the presence of user phone 130 within IoT proximal network 160. Alternatively, presence detection block 316 may generate periodic requests or pings to user phone 130 for response or confirmation to the pings, or for periodic refreshment of the registration, for example, over the home network. If a threshold number of such pings go unanswered or a threshold number of registrations are missed, then presence detection block 316 may conclude that user phone 130 has left the premises or vicinity of IoT proximal network 160. Presence detection block 316 may also use indirect means for detecting presence of the user. For example, one of IoT device 301-303 may be the user's car, and the presence or absence of the user's car may be correlated to the presence or absence of the user. In this manner, events/status updates from other IoT devices can also be used to detect the user's presence. In further aspects, the control application on user phone 130 may communicate with presence detection block 316 to apprise presence detection block regarding presence or absence (or in some cases, corresponding entry or departure) of user phone 130 in IoT proximal network 160. Presence detection block 316 may also make use of other platforms or discovery mechanisms to detect presence/absence of one or more registered users or user phone 130.

Based on whether user phone 130 is present or absent in IoT proximal network 160, as detected by presence detection block 316, for example, control rules for remote access/remoting can be updated in block 314, and remote access/remoting may be enabled or disabled accordingly in block 312. Once again updating the remote access/remoting control rules in block 314 may be further based on the user's registration, as provided by block 310 (e.g., whether the specific user of user phone 130 is a primary user whose presence/absence should determine enabling/disabling decisions for remote communication). In some aspects, the same or common set of control rules can be defined for remote access to the IoT devices, as well as for remoting of notification from the IoT devices. In another embodiment, separate sets of control rules can be defined for the remote access and the remoting features.

In more detail, the remote access/remoting control rules block 314 will determine, based on a user's registration, whether remote access/remoting is permitted. In one case, remote access/remoting may only be enabled when user phone 130 is designated as a primary user and user phone 130 is located outside of IoT proximal network 160, as determined from presence detection block 316. Similarly, remote access/remoting may be disabled when user phone 130 is designated as a primary user and user phone 130 is present within IoT proximal network 160, as determined by presence detection block 316. Once again, these rule updates may be based on the assumption that when the primary user is present within his or her home, for example, remote access to and/or remoting from IoT devices 301-303 is unnecessary, and thus, IoT SuperAgent/Gateway 145 may close off the paths for remote access and remoting.

In some cases, where more than one primary user is present, the remote access/remoting control rules in block 314 can be customized in several ways. For example, if there are one or more additional IoT user devices (such as user phone 130, but not explicitly shown) in IoT proximal network 160, then enabling/disabling remote communication can be based on the presence/absence detection of a subset or any one of the plurality of IoT user devices in IoT proximal network 160. Remote communication criteria pertaining to each of the one or more IoT user devices can be individually configured. Disabling/enabling remote communication can be based on various combinations involving specific IoT user devices and corresponding remote communication criteria.

For example, remote access/remoting may be disabled only when all of the IoT user devices designated as primary users are within IoT proximal network 160 (e.g., when both parents of a household are at home, remote access/remoting may not be needed, and thus can be disabled). Alternatively, remote access/remoting may be disabled when any one or any predefined subset of the primary users are within IoT proximal network 160 (e.g., when one parent is home, remote access/remoting may be disabled for the other parent). In yet another alternative, remote access/remoting may be enabled when any of the primary users are detected to be outside IoT proximal network 160 (e.g., when any one of two parents is detected to have left the home, remote access/remoting may be enabled). Various other alternatives and customizations along the above lines are within the scope of the embodiments. In general, presence or absence of one or more controller devices in a proximal network may be used as criteria in determining whether to disable or enable remote access to/remoting from IoT devices in the proximal network.

While remote access/remoting control rules in block 314 may relate to the presence or absence of user phone 130 in the above manner, additionally, or alternatively, remote access/remoting control rules may also relate to events or time functions. As an example of an event which may be used to influence decisions for enabling/disabling remote access/remoting, one or more IoT devices 301-303 within IoT proximal network 160 may trigger an update, such as an emergency or failure, which can be used in conjunction with other remote access/remoting control rules. In a specific illustration, the breakdown or malfunction of an IoT device such as a water heater, may trigger an emergency notification to IoT SuperAgent 160. In this case, if IoT SuperAgent 160 recognizes that one primary user (e.g. a first primary user previously designated as requiring remote access in such emergency situations) is not within IoT proximal network 160 even though a second primary user is present within IoT proximal network 160 (e.g., based on input from presence detection block 316), remote access/remoting control rules may be updated in block 314 in order to instruct remote access/remoting enable/disable block 312 to grant remote access/enable remoting for the first primary user. This remote access/remote control rule update may override previously configured control rules (e.g., to enable remote access/remoting only when all primary users are absent). Various other such customizations are possible based on events, without departing from the scope of this disclosure.

Remote access/remoting control rules in block 314 may also be based on times of the day or the week. For example, regardless of whether or not designated primary users are present in IoT proximal network 160, remote access/remoting control rules in block 314 may be set such that remote access/remoting is disabled during certain time periods. For example, remote access/remoting may be shut off from 10 PM to 6 AM. In the case of an office setting, remote access/remoting may be shut off during business hours during the week, and only enabled after hours or during the weekend, or vice versa, depending on particular preferences and requirements for security. Remote access/remoting control rules in block 314 can also be defined based on a combination of user presence/absence and times of day. For example, If a given primary user of a household (e.g., a wife)

is present within IoT proximal network 160, remote access/remoting control rules may pertaining to disabling remote access to an IoT device such as an oven (not explicitly shown), except on Friday nights between 5 pm and 8 pm, when another primary user of the household (e.g., a husband) is likely to operate the oven for preparing Friday night dinner.

Accordingly, embodiments may relate to controlling the enabling or disabling of remote access/remoting based on user presence, times of day/week, and/or generally based on any other combination of one or more of the above-described criteria. Related aspects of enabling remote access/remoting may also be similarly based on user presence/absence, and optionally, additional remote access criteria. For example, if an authorized user (e.g. a primary user) is determined not to be present (or is determined to be absent) from IoT proximal network 160, then prior to enabling remote access/remoting, certain additional criteria may be optionally checked in remote access/remoting control rules block 314. If these additional criteria are also met, then remote access/remoting may be enabled in block 312. In some cases, there may be no additional criteria, and if the user is detected to be absent, remote access/remoting may be enabled.

In some aspects, remote access/remoting control rules in block 314 can also be configured to define remote communication criteria differently for different IoT devices based on an one or more primary users operating the IoT devices. For example, the remote access/remoting control rules may be configured for enabling remote access/remoting for IoT devices such as a water heater, HVAC system, and a home theater system (these devices have not been explicitly illustrated) if a first primary user (e.g., a husband) has been determined to be absent from IoT proximal network 160. Further, the remote access/remoting control rules may be configured for disabling remote access/remoting for these IoT devices when the first primary user is determined to be present in IoT proximal network 160. In another related example, the remote access/remoting control rules may be configured for enabling remote access/remoting for IoT devices such as a washer/dryer and an oven (not explicitly illustrated), when a second primary user (e.g., a wife) is determined to be absent from IoT proximal network 160. Further, the remote access/remoting control rules may be configured for disabling remote access/remoting for these IoT devices when the second primary user is determined to be present in IoT proximal network 160. Accordingly, the remote access/remoting control rules may be configured such that selected one or more IoT devices are associated with a particular one of one or more primary users and remote access/remoting for these selected one or more IoT devices is enabled when the associated primary user is determined to be absent from the IoT proximal network and their corresponding remote access/remoting is disabled when the associated primary user is determined to be present in the IoT proximal network.

Figure 4:
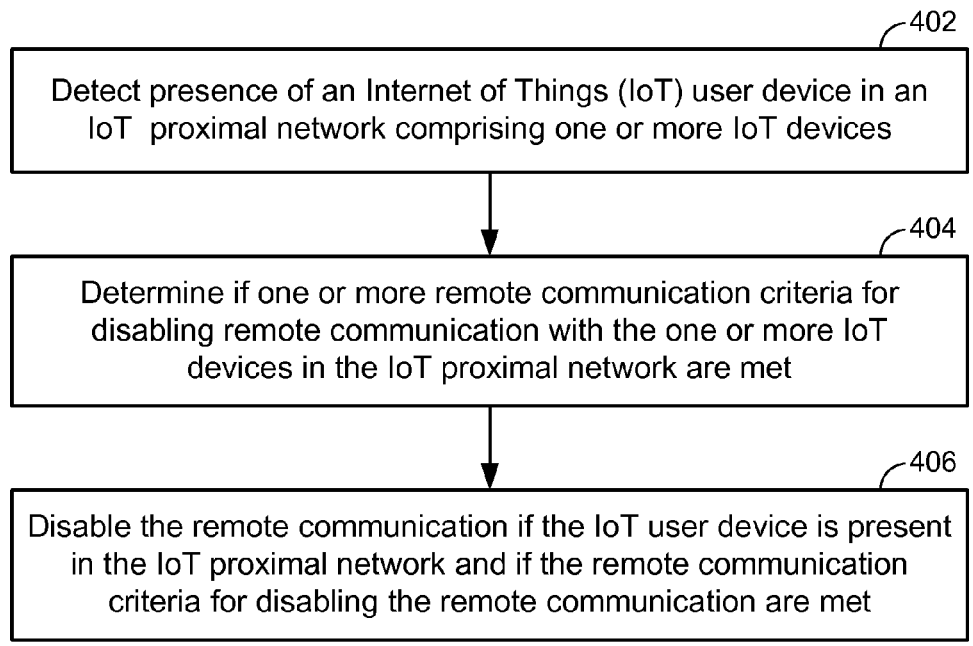
FIGS. 4-5 illustrate exemplary methods of controlling remote communication with IoT devices of an IoT proximal network based on exemplary remote communication criteria.

It will be appreciated that embodiments include various methods for performing the processes, functions and/or algorithms disclosed herein. For example, as illustrated in FIG. 4, an embodiment can include a method of controlling remote access to a Internet of Things (IoT) proximal network (e.g. IoT proximal network 160 of FIG. 3) comprising one or more IoT devices (e.g., IoT devices 301-303), the method comprising: detecting presence of an IoT user devices (e.g. using presence detection block 316 to detect presence/absence of user phone 130) in the IoT proximal network—Block 402; determining if one or more remote communication criteria (e.g., remote access/remoting control rules of block 314) for disabling remote communication with the one or more IoT devices in the IoT proximal network are met—Block 404; and disabling the remote communication (e.g. by remote access/remoting enable/disable block 312 of IoT SuperAgent/Gateway 145) if the IoT user device is present in the IoT proximal network and if the remote communication criteria for disabling the remote communication are met—Block 406.

Figure 5:
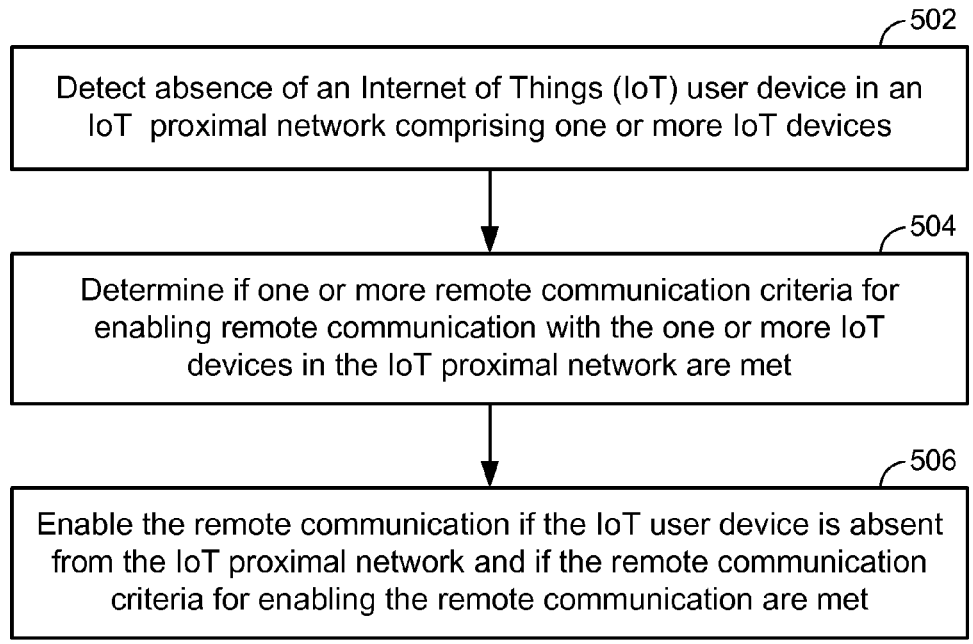

Similarly, as illustrated in FIG. 5, another embodiment can include a method of controlling remote communication with a Internet of Things (IoT) proximal network (e.g. IoT proximal network 160 of FIG. 3) comprising one or more IoT devices (e.g., IoT devices 301-303), the method comprising: detecting absence of an IoT user device (e.g. using presence detection block 316 to detect presence/absence of user phone 130), in the IoT proximal network—Block 502; determining if one or more remote communication criteria for enabling remote communication (e.g., by means of remote access/remoting control rules of block 314) with the one or more IoT devices in the IoT proximal network are met—Block 504; and enabling the remote communication if the IoT user device is absent from the IoT proximal network and if the remote communication criteria for enabling the remote communication are met—Block 506.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of controlling remote communication with an Internet of Things (IoT) proximal network comprising one or more IoT devices, the method comprising:
   detecting, by an IoT SuperAgent/Gateway configured to control remote communication with the IoT proximal network, presence of a user device in the IoT proximal network, wherein the user device is previously registered with the IoT SuperAgent/Gateway;
   determining, by the IoT SuperAgent/Gateway, if one or more remote communication criteria for disabling remote communication by one or more devices outside the IoT proximal network with the one or more IoT devices in the IoT proximal network are met; and
   disabling, by the IoT SuperAgent/Gateway, the remote communication by the one or more devices outside the IoT proximal network with the one or more IoT devices in the IoT proximal network if the user device is present in the IoT proximal network and if the one or more remote communication criteria for disabling the remote communication are met.

2. The method of claim 1, wherein the remote communication comprises remote access of the one or more IoT devices in the IoT proximal network by the user device.

3. The method of claim 1, wherein the remote communication comprises remote access of the one or more IoT devices in the IoT proximal network by a cloud service.

4. The method of claim 1, wherein the remote communication comprises remoting notifications of messages or events from the one or more IoT devices in the IoT proximal network to the user device.

5. The method of claim 1, wherein detecting the presence of the user device in the IoT proximal network is based on a control application for communicating presence or absence of the user device to the IoT SuperAgent/Gateway, wherein the control application is executed on the user device.

6. The method of claim 1, wherein detecting the presence of the user device in the IoT proximal network is based on a periodic refreshment of registration of the user device with the IoT SuperAgent/Gateway.

7. The method of claim 1, wherein the one or more remote communication criteria for disabling remote communication to the IoT proximal network include at least one of: one or more events or one or more time instances.

8. The method of claim 1, wherein the one or more remote communication criteria are based on a direction of the remote communication.

9. The method of claim 1, wherein disabling the remote communication comprises selectively disabling remote communication capability with respect to selected functionalities of the one or more IoT devices.

10. The method of claim 1, further comprising detecting presence of one or more additional user devices in the IoT proximal network, wherein the one or more additional user devices are previously registered with the IoT SuperAgent/Gateway; and disabling the remote communication based on presence of a subset of one or more of the user devices in the IoT proximal network and remote communication criteria pertaining to each of the subset of the one or more IoT devices which are present in the IoT proximal network.

11. The method of claim 10, wherein the one or more remote communication criteria for disabling remote communication to the IoT proximal network include priority levels for the user device, and for each of the one or more additional user devices, based on a registration of the user device, and registrations of the one or more additional user devices, in the IoT proximal network, wherein the priority levels include a primary user tier and a secondary user tier.

12. A method of controlling remote communication with an Internet of Things (IoT) proximal network comprising one or more IoT devices, the method comprising:
   detecting, by an IoT SuperAgent/Gateway configured to control remote communication with the IoT proximal network, absence of a user device in the IoT proximal network, wherein the user device is previously registered with the IoT SuperAgent/Gateway;
   determining, by the IoT SuperAgent/Gateway, if one or more remote communication criteria for enabling remote communication by one or more devices outside the IoT proximal network with the one or more IoT devices in the IoT proximal network are met; and
   enabling, by the IoT SuperAgent/Gateway, the remote communication by the one or more devices outside the IoT proximal network with the one or more IoT devices in the IoT proximal network if the user device is present in the IoT proximal network and if the one or more remote communication criteria for enabling the remote communication are met.

13. The method of claim 12, wherein the remote communication comprises remote access of the one or more IoT devices in the IoT proximal network by the user device or a cloud service.

14. The method of claim 12, wherein the remote communication comprises remoting notifications of messages or events from the one or more IoT devices in the IoT proximal network to the user device.

15. The method of claim 12, wherein detecting the presence of the user device in the IoT proximal network is based on a control application for communicating presence or absence of the user device to the IoT SuperAgent/Gateway, wherein the control application is executed on the user device.

16. The method of claim 12, wherein detecting the absence of the user device in the IoT proximal network is based on a periodic refreshment of registration of the user device with the IoT SuperAgent/Gateway.

17. The method of claim 12, wherein the one or more remote communication criteria for enabling remote communication to the IoT proximal network include at least one of: one or more events or one or more time instances.

18. The method of claim 12, wherein the one or more remote communication criteria are based on a direction of the remote communication.

19. The method of claim 12, wherein the one or more remote communication criteria for enabling remote communication to the IoT proximal network include designations or priority levels of the user device among a set of one or more user devices that are capable of communicating with the one or more IoT devices in the IoT proximal network, based on a registration of the user device in the IoT proximal network.

20. An apparatus comprising:
   a memory for storing instructions; and
   a processor coupled to the memory and configured to execute the instructions, including instructions for:
      an Internet of Things (IoT) SuperAgent/Gateway configured to control remote communication with an IoT proximal network comprising one or more IoT devices;
      a Presence Detection block configured to detect whether a user device is present in the IoT proximal network, wherein the user device is previously registered with the IoT SuperAgent/Gateway;
      a Remote Access/Remoting Control Rules block configured to determine if one or more remote communication criteria for disabling remote communication by one or more devices outside the IoT proximal network with the one or more IoT devices in the IoT proximal network are met; and
      a Remote Access/Remoting Enable/Disable block configured to disable the remote communication by one or more devices outside the IoT proximal network with the one or more IoT devices in the IoT proximal network if the user device is present in the IoT proximal network and if the one or more remote communication criteria for disabling the remote communication are met.

21. The apparatus of claim 20, wherein the Remote Access/Remoting Enable/Disable block is further configured to enable the remote communication if the user device is not present in the IoT proximal network and if the one or more remote communication criteria for enabling the remote communication are met.

22. The apparatus of claim 20, wherein the remote communication comprises remote access of the one or more IoT devices in the IoT proximal network by the user device or a cloud service.

23. The apparatus of claim 20, wherein the remote communication comprises remoting notifications of messages or events from the one or more IoT devices in the IoT proximal network to the user device.

24. The apparatus of claim 20, wherein the Presence Detection block is configured to detect if the user device is present in the IoT proximal network based on communication from a control application on the user device regarding presence or absence of the user device in the IoT proximal network.

25. The apparatus of claim 20, further including instructions for a User Registration block, wherein the Presence Detection block is configured to detect if the user device is present in the IoT proximal network based on a periodic refreshment of registration of the user device with the User Registration block.

26. The apparatus of claim 25, wherein the one or more remote communication criteria for enabling or disabling remote communication include designations or priority levels of the user device stored in the User Registration block, the User Registration block configured to store designations or priority levels of a set of one or more user devices that are capable of communicating with the one or more IoT devices in the IoT proximal network.

27. The apparatus of claim 20, wherein the one or more remote communication criteria for disabling remote communication to the IoT proximal network include at least one of: one or more events or one or more time instances.

28. A communication system comprising:
   means for controlling remote communication with an Internet of Things (IoT) proximal network comprising one or more IoT devices;
   means for detecting whether a user device is present in the IoT proximal network wherein the user device is a previously registered user device;
   means for determining if one or more remote communication criteria for disabling remote communication by one or more devices outside the IoT proximal network with the one or more IoT devices in the IoT proximal network are met; and means for disabling the remote communication by one or more devices outside the IoT proximal network with the one or more IoT devices in the IoT proximal network if the user device is present in the IoT proximal network and if the one or more remote communication criteria for disabling the remote communication are met.

29. The communication system of claim 28, further comprising means for enabling the remote communication if the user device is not present in the IoT proximal network and if the one or more remote communication criteria for enabling the remote communication are met.

30. The communication system of claim 28, wherein the remote communication comprises:
   remote access of the one or more IoT devices in the IoT proximal network by the user device or cloud service; and
   remoting notifications of messages or events from the one or more IoT devices in the IoT proximal network to the user device.

* * * * *